United States Patent [19]

Gassmann

[11] Patent Number: 4,642,675
[45] Date of Patent: Feb. 10, 1987

[54] SUPERHETERODYNE RECEIVER

[75] Inventor: Gerhard G. Gassmann, Esslingen, Fed. Rep. of Germany

[73] Assignee: ITT Industries, Inc., New York, N.Y.

[21] Appl. No.: 599,760

[22] Filed: Apr. 13, 1984

[30] Foreign Application Priority Data

Apr. 16, 1983 [DE] Fed. Rep. of Germany ....... 3313867

[51] Int. Cl.$^4$ ............................................. H04N 9/64
[52] U.S. Cl. .................... 358/21 R; 358/23; 358/188; 455/109
[58] Field of Search ................ 358/188, 21 R, 23, 25; 455/47, 109, 203

[56] References Cited

U.S. PATENT DOCUMENTS 4,193,035 3/1980 Berger ................................. 455/203
4,310,920 1/1982 Hayes ..................................... 455/47

Primary Examiner—Michael A. Masinick
Attorney, Agent, or Firm—Donald J. Lenkszus

[57] ABSTRACT

A superheterodyne receiver using the "Third Method" is equipped for reception of color-television programs. The oscillator frequency for the first mixer is located exactly in the middle between the picture carrier and the chrominance subcarrier, so that the picture carrier and the chrominance subcarrier coincide at the intermediate frequency. The Nyquist slope for the picture carrier is made steeper, so that one loss-pass filter slope determines the Nyquist slope for the picture carrier and the chrominance subcarrier and the adjacent-channel selectivity on both sides in the RF spectrum.

12 Claims, 7 Drawing Figures

SUPERHETERODYNE RECEIVER

BACKGROUND OF THE INVENTION

This invention relates to a superheterodyne receiver for receiving an amplitude-modulated RF signal.

To generate and demodulate single-sideband signals, three systems have been developed: a filter method, a phasing method, and a so-called "Third Method". The latter has many uses beyond its original application. Generally speaking, it permits any frequency band to be arbitrarily shifted in frequency, all adjacent frequencies and mixer products being simultaneously suppressed by simple means. The only filtering devices required are low-pass filters which not only eliminate unwanted mixer products but also suppress interferences caused by frequencies outside the original frequency band. The main disadvantage of this method is due to the fact that the frequency band to be shifted simultaneously passes through two branches which should be of exactly the same design but are not in practice.

While being processed, the frequency band is imaged onto itself, but the image components disappear again if the two branches are exactly alike. If the branches are unlike, interfering components will remain which, however, originate from the frequency band to be processed, not from an external frequency band. In a speech or music signal, for example, a low-pitched tone, for example causes a highly attenuated high-pitched tone, whose amplitude correlates with that of the low-pitched tone. If, in addition, a pilot signal or a subcarrier is present whose amplitude does not depend on that of the speech or music signal or even rises when the speech or music signal disappears, the "image" of the pilot signal or subcarrier will, in most cases, cause spurious unwanted responses.

The demodulation of a single-sideband signal is nothing but a frequency shift from the RF range to a baseband. The generation of a single-sideband signal is nothing but a shift of the frequency of a baseband signal to the RF range. A reversal of the entire frequency band may be necessary, but this is mathematically equivalent to a shift to the negative frequency range, so that besides the choice of different oscillator frequencies, no additional steps have to be taken. The demodulation of a vestigial-sideband-modulated television signal, too, is nothing but a frequency shift to the baseband, so that the original picture carrier drops to zero frequency. If the television signal is demodulated by the "Third Method", the image of the picture carrier falls within the video signal, and thus, results in a spurious pattern (moire) in the reproduced picture. In a color television receiver, hue errors additionally result from the interaction of the images of the picture carrier and the chrominance subcarrier.

SUMMARY OF THE INVENTION

It is an object of the invention to make the "Third Method" applicable to the reception of television signals in a color-television receiver.

An invention in accordance with the oscillator frequency for the first mixer is located exactly in the middle between the picture carrier and the chrominance subcarrier so that the picture carrier and the chrominance subcarrier coincide at the intermediate frequency. The Nyquist slope for the picture carrier is made steeper, so that one low-pass filter slope determines the Nyquist slope for the picture carrier and the chrominance subcarrier and the adjacent-channel selectivity on both sides in the RF spectrum.

BRIEF DESCRIPTION OF THE DRAWINGS

An embodiment of the invention will now be explained in more detail with reference to the accompanying drawings, in which.

DETAILED DESCRIPTION

Figure 1:
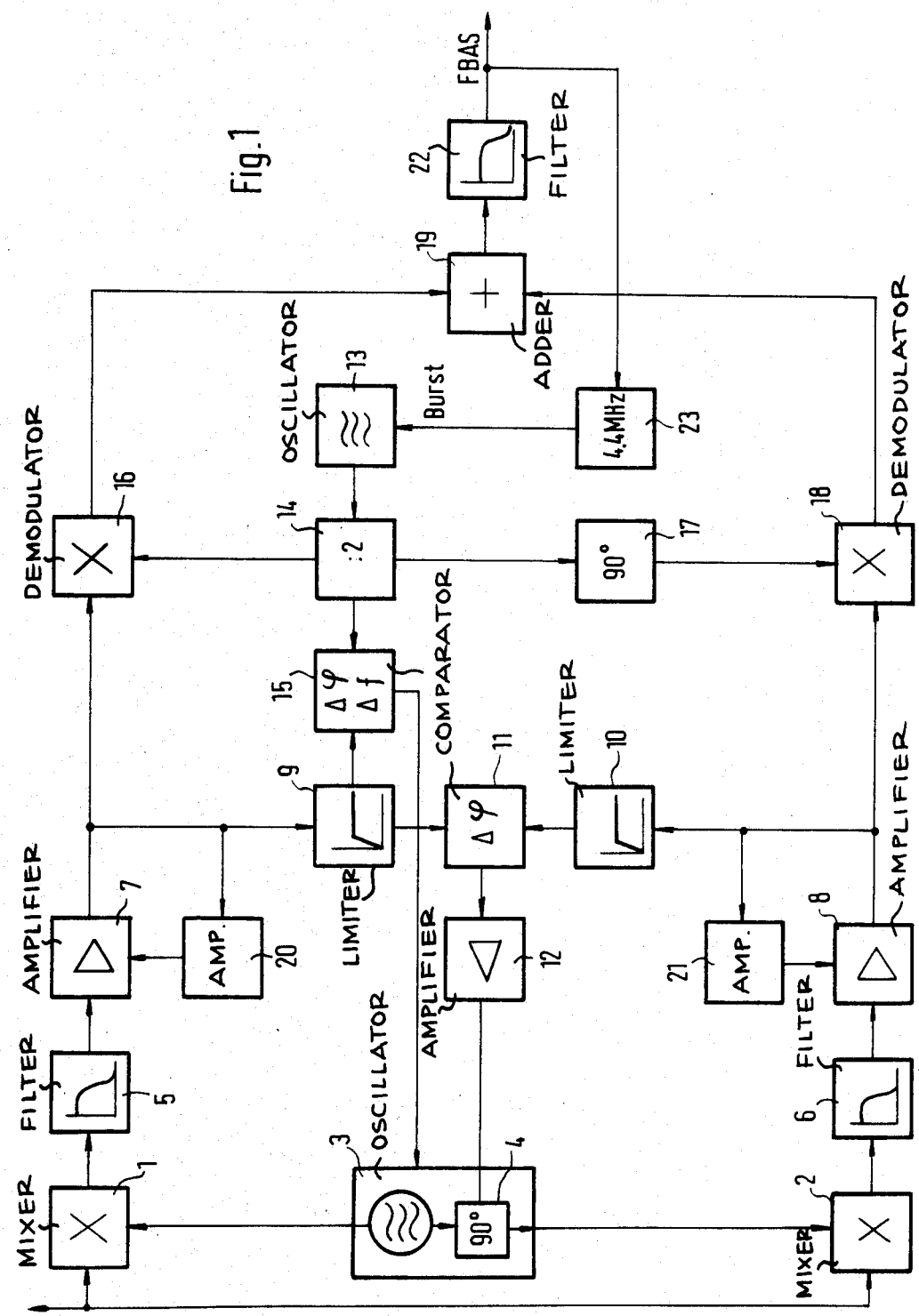
FIG. 1 is a block diagram of a television receiver in accordance with the invention.

In FIG. 1, the received television signal is applied to two RF mixers 1 and 2. In the example shown, no RF preselection takes place. RF preselection is necessary, however, if the received television signal is mixed with nonsinusoidal voltages in the mixers 1 and 2. In such a case, at least those frequencies have to be removed by filtering which are equal to the multiple of the frequency to be received. One of the output signals of an RF oscillator 3 is applied directly to the RF mixer 1, and the other passes through a 90° phase shifter 4, regarded here as a part of the RF oscillator 3, and is applied to the second RF mixer 2. Tuning means by which the RF oscillator 3 is tunable to the desired television channel in a known manner are not shown. The nominal frequency of the RF oscillator 3 is located exactly in the middle between the picture-carrier frequency and the chrominance-subcarrier frequency of the television channel to be received. The RF mixers 1 and 2 are followed by low-pass filters 5 and 6, respectively, which are followed by gain-controlled amplifiers 7 and 8, respectively. Two synchronous demodulators 16 and 18 demodulate the output signals of the amplifiers 7 and 8, respectively. The outputs of the synchronous demodulators 16 and 18 are applied to an adder 19, added there, and applied to a video low-pass filter 22 with a bandwidth of about 5 to 6 MHz. The output of the low-pass filter 22 provides the desired video signal (composite color signal FBAS).

To form the carrier frequencies to be inserted in the synchronous demodulators 16 and 18, a chrominance-subcarrier oscillator 13, a divide-by-two frequency divider 14, and a 90° phase shifter 17 are present. The nominal frequency of the chrominance subcarrier oscillator 13 is the chrominance-subcarrier frequency, about 4.433 MHz.

The chrominance-subcarrier oscillator is synchronized with the burst of the video signal in the known manner. Its output signal is applied to the frequency divider 14, output signals of which are fed directly to the synchronous demodulator 16 and through the 90° phase shifter 17 to the synchronous demodulator 18, respectively.

The 90° phase shifter 4 for the oscillator frequency should, as far as possible, produce a phase shift of exactly 90° within a very wide frequency range which nearly, coincides with the received frequency range. However, it can have a relatively narrow bandwith if tunable at the respective operating frequency. Such a tunable phase shifter 4 is used in conjunction with two limiters 9 and 10, a phase comparator 11, and a gain-controlled amplifier 12. In the limiters 9 and 10, the outpu signals of the amplifiers 7 and 8, respectively, are freed from their modulation to obtain the picture IF carriers produced in the RF mixers 1 and 2, which should be separated in phase by 90°. This is checked in the phase comparator 11, to which the two picture IF carriers are applied. The phase comparator 11 forms a control signal which is passed through the gain-controlled amplifier 12 to the phase shifter 4 and readjusts the latter in such a way that the two picture IF carriers actually differ in phase by 90° as precisely as possible.

The limiters 9 and 10 may be replaced by other units suitable for separating the picture IF carriers from the IF signals, such as peak detectors or very narrow-band filters.

The frequency of the RF oscillator 3 must be exactly in the middle between the picture-carrier frequency to be received and the chrominance-subcarrier frequency. Even slight deviations result in moire. Therefore, for the precise adjustment of the RF oscillator 3, which is achieved when the picture IF carrier and the chrominance IF carrier are in synchronism, a phase and frequency comparator 15 is provided. It is fed with the chrominance-subcarrier signal, whose frequency has been halved in the frequency divider 14, and the picture IF carrier derived in the limiter 9. It forms a control voltage which is phase-dependent when the two signals are equal in frequency. The control voltage is applied to the RF oscillator 3 to synchronize the picture IF carrier with the chrominance IF subcarrier. A phase and frequency comparator with the desired characteristics is disclosed, for example, in German Pat. No. 12 87 689. which corresponds in part to British Pat. No. 1,077,539 published Aug. 2, 1967.

Figure 1A:
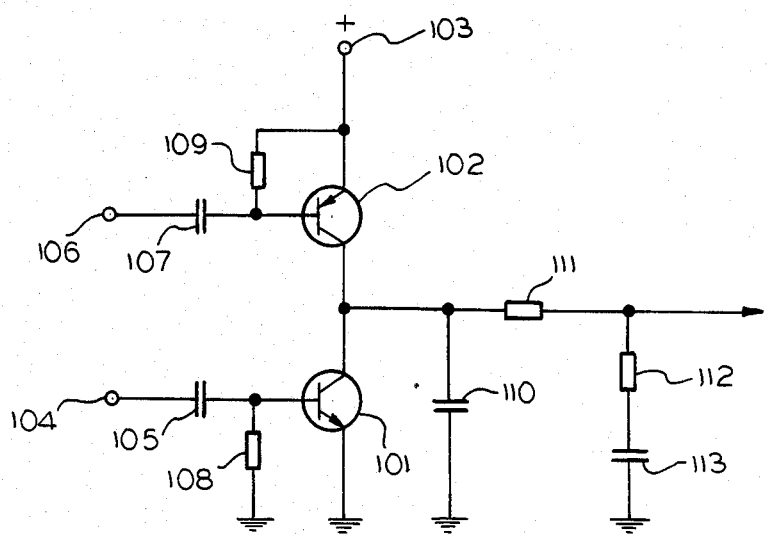
FIGS. 1a and 1b show phase and frequency comparators of a known type which may be used in the circuit of the invention.
Figure 1B:
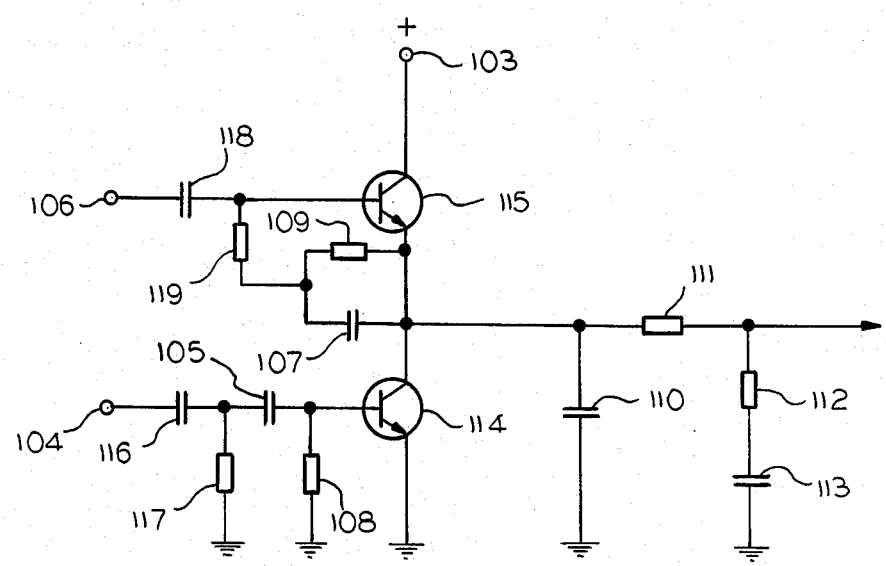

Two such circuits are shown in FIGS. 1a and 1b. In the circuit of FIG. 1a, npn transistor 101 and pnp transistor 102 have their collector electrodes connected to one another, while the series arrangement of the two transistors is connected to a source of voltage 103. One of the sum voltages is connected to terminal 104 and applied from there via coupling capacitor 105 to the base electrode of transistor 101, while the other sum voltage is similarly applied to the base electrode of the transistor 102 from the terminal 106, via a second coupling capacitor 107. Reference numerals 108 and 109 indicate the base leakage resistances. The capacitor 107 should give a time constant with the resistance 109, and the capacitor 105 should give a time constant with the resistance 108, which are each substantially greater than the greatest duration of period of the ultimate difference frequency to be expected. As is well-known, the greatest duration of period of the ultimate difference frequency to be expected is dependent upon the degree of error-correction required. The greater the error-correction achieved, the smaller is the normal pull-in range, which is dependent solely on the phase comparison, and which is intended to be considerably widened with the aid of the frequency error-dependent correcting voltage. With these particularly large time constants it is achieved that the base biasing potentials are higher than the individual signal voltages, but lower than the sum voltages. For this, it is assumed in addition that the charging time constant of the capacitors is very small, which in turn is dependent upon the capacity of capacitor 105 or 107, as the case may be, and upon the value of the impedance of the signal sources. In the case particularly of relatively high-impedance signal sources, it is possible to produce the biasing potentials alternatively with the aid of batteries or the like.

Between the connecting point of the two transistors and ground a storage capacitor 110 is connected for storing the potential of the respective - last occuring peak value of the difference frequency voltage, in the case of unequal frequency of the two signals to be compared. However, instead of this capacitor other well-known forms of storage device may be used, such as a bistable multi-vibrator. By use of the filter circuit comprising resistors 111 and 112, and capacitor 113, filtering is effected of the phase error-dependent correcting voltage developed in the event of coincidence between the frequencies of the two signals, and of the frequency error-dependent correcting voltage developed in the event of a non-coincidence between the frequencies, which arises by storage of the potential of the respective last occurring values. In cases where a separate storage device, such as a bistable multi-vibrator, is used instead of the capacitor 110 for the storing purpose, the freuency-error-dependent correcting voltage must be derived from this separate storage device, and the phase-error-dependent correcting voltage, as before, must be derived from the connection of the two transistors and, if necessary, both correcting voltages may be added to one another in known manner.

FIG. 1b shows a circuit arrangement according to the invention having two transistors 114 and 115 of the same kind (e.g. npn as shown). In this case also both transistors are connected in tandem to one source of supply voltage 103, but the collector electrode of transistor 114 is connected to the emitter electrode of transistor 115. At this connecting point there are again arranged the storage capacitor 110 and the filter circuit 111, 112, 113. The sum voltage applied to the terminal 104 is fed to the base electrode of transistor 114 via both capacitor 116 and capacitor 105. The sum voltage applied to the terminal 106 is fed to the base electrode of transistor 115 via the capacitor 118. The capacitor 118 and the resistor 119 constitute a frequency-filtered network, of such kind that the time constant 118, 119 is very small with respect to the period of the highest difference frequency to be expected, but very large with respect to the period of the signal voltages. The resistor 109 in shunt with capacitor 107 produces a biasing potential for the base electrode of transistor 115, and the capacitor 105 in conjunction with the resistor 108 produces the biasing potential for the base electrode of transistor 114. Similar considerations apply to the time constants of these bias circuits as for FIG. 1a. The R.C.-circuit 116, 117 should have about the same time constant as the R.C.-circuit 118, 119, so as to provide similar conditions to those existing at the input of transistor 15.

The gains of the amplifiers 7 and 8 are controllable. From the output signals of these amplifiers, two gain-controlled amplifiers 20 and 21 derive control voltages which are applied to the amplifiers 7 and 8, respectively, to control the gains of the latter. The control should be so precise that the amplitudes of the IF signals are as equal as possible. Errors <1% are achievable, for example, by processing the output signals in the gain-controlled amplifiers 20 and 21 with digital circuitry which compares the peak amplitudes with a nominal value and derives the control voltages from the result of the comparison. Another possibility (not shown in FIG. 1) is to compare the peak amplitudes of the two output signals in an additional gain-controlled amplifier, derive an additional control voltage from the result, and use this control voltage to additionally act on either of the two amplifier 7 and 8.

The operation of the television receiver of FIG. 1 will now be explained in more detail with the aid of FIGS. 2 and 3. At the same time, requirements to be placed on individual modules will be specified in more detail.

Figure 2:
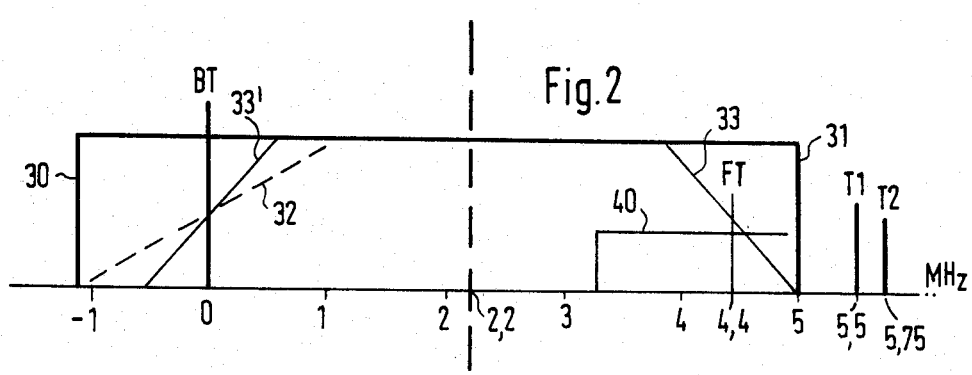
FIG. 2 shows the spectrum of a television channel, the frequencies being given not as absolute values but relative to the picture-carrier frequency.
Figure 3:
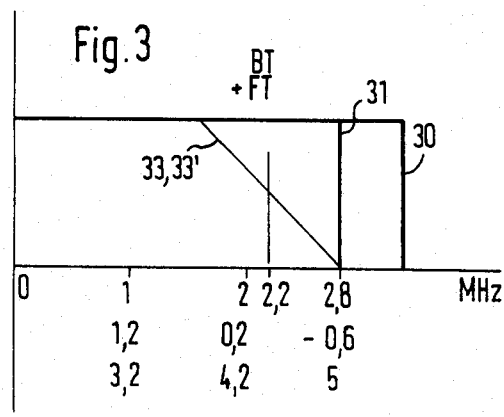
FIG. 3 shows the spectrum of the television channel after the mixing in the RF mixers.

FIG. 2 shows the spectrum of a televison signal. The frequency scale is normalized, i.e., it gives the deviation from the frequency of the picture carrier. If the frequency of the picture carrier is 300 MHz, for example, the chrominance subcarrier is at 304.4 MHz, and the (first) sound carrier at 305.5 MHz. A further sound carrier may be located at 305.75 MHz. The picture carrier is designated BT, and the chrominance subcarrier FT. Two sound carriers are designated T1 and T2. The spectrum is that of the vestigial-sideband-modulated signal with a lower band limit 30 and an upper band limit 31. It contains the color-signal spectrum 40. In the intermediate-frequency range, band-pass filters of the selective circuits commonly used in conventional superheterodyne receivers with high intermidiate frequency change the color-signal spectrum so as to cause the flatter Nyquist slope 32 in the range of the picture carrier and a steeper Nyquist slope 33 for the color signal. The color signal is vestigial-sideband-modulated, too. The invention is based inter alia, on the fact that it is readily possible to replace the flatter Nyquist slope 32 with a steeper Nyquist slop 33' having the same rate of rise as the steeper Nyquist slope 33.

Since the frequency of the RF oscillator 3 is located exactly in the middle between the picture carrier BT and the chrominance subcarrier FT, the 2.2 MHz fold frequency of the IF signals at the outputs of the RF mixers 1 and 2 is located exactly at zero frequency. Around this zero center frequency, a "central fold" is obtained such that the picture IF carrier and the chrominance subcarrier have the same frequency and are in phase lock. This is illustrated in FIG. 3. The frequency axis gives the absolute frequency, to which the normalized frequencies according to FIG. 2 have been added on a double scale. Instead of the exact value for the frequency separation between the picture carrier and the chrominance subcarrier, a rounded value of 4.4 MHz is used. The IF signals at the outputs of the RF mixers 1 and 2 are separated in phase by 90°. The two band limits 30 and 31 are located at different frequencies in the IF range, but the two steeper Nyquist slopes 33 and 33' coincide in the IF range. They are formed by the slopes of the low-pass filters 5 and 6. The low-pass filter slopes must thus be such as to reduce the picture IF carrier and the chrominance IF carrier to one half and to be approximately symmetrical about this frequency with respect to shape and rate of rise. Since the color spectra and the luminance spectra are "in mesh" in accordance with the standard (i.e., the comb-like color spectrum lies in the gaps of the comb-like luminance spectrum), the folded luminance spectra are meshed as well. As a result, no interferences will occur in the luminance signal even if remnants of the folded signal remain after the subsequent "fold-back". The folded lines of the color spectrum coincide with the lines of the luminance spectrum; remnants of the color spectrum are, therefore, covered by the luminance spectrum and vice versa.

The phase and frequency comparator 15 is designed to produce a "detuning-dependent" control voltage, i.e., a control voltage whose polarity is dependent on the direction of the detuning, when its input signals exhibit major frequency differences. It is a control voltage which, unlike a control voltage obtained only by a frequency comparison, does not lose its frequency controlling effect. After this control voltage has greatly reduced the frequency deviation, a phase-dependent control voltage is obtained with which the phase locking is achieved. According to the invention, the nominal phase is so chosen that, when the two signals have the same frequency, the picture IF carrier is in phase with the R-Y signal (in the case of PAL), or the phase of the picture IF carrier differs by 90° from the phase corresponding to a color at which, subjectively, a slight error is least perceptible (in the case of NTSC). A deviation of the picture IF carrier from its nominal phase then results in a color-saturation error at the color corresponding to the nominal phase; a 90° phase difference results in a hue error. If one of the two 90° phase shifters 4 and 17 does not have a phase shift of exactly 90°, or if the gains of the two branches are slightly different, in the PAL system the residual hue error is completely eliminated as a result of the PAL alternation if the phase condition (phase of picture IF carrier=R-Y phase) is approximately satisfied. In the NTSC system, the error is kept to a minimum. The nominal phase can be influenced, for example, by placing an adjustable phase shifter ahead of the phase and frequency comparator 15.

In the synchronous demodulators 16 and 18, the two IF signals are mixed with two voltages of half the chrominance-subcarrier frequency which are 90° apart in phase, and thus demodulated. The mixing is done simply by reversing the polarities of the IF signals at half the chrominance-subcarrier frequency. This mixing by polarity reversal can be performed in analog fashion or, if the IF signals are digitized, digitally by inverting the sign bit at half the chrominance-subcarrier frequency, which is used as the switching frequency.

Figure 4:
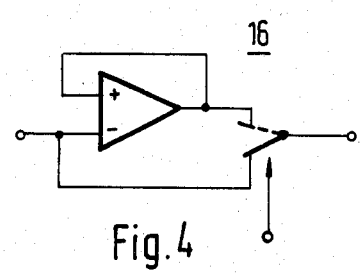
FIG. 4 is a circuit diagram of a synchronous demodulator.

FIG. 4 shows a possible implementation of a synchronous demodulator. An operational amplifier is connected as an inverter, and a switch switches between the output signal and the input signal of the inverter at half the chrominance-subcarrier frequency.

Each of the two synchronous demodulators 16 and 18 delivers the complete video signal in the normal position and in the inverted position. The adder 19 amplifies the two video signals that are in the normal position, and suppresses the two video signals that are in the inverted position. Depending on the direction of the phase shift in the two phase shifters 4 and 17, a subtracter may be required in place of the adder 19 to obtain the signal in the normal position.

The video signal so obtained passes through the video low-pass filter 22, whose bandwidth is so chosen that frequencies above the video band are suppressed, mainly the fourfold frequency of the picture IF carrier (in the present example, 4×2.2 MHz-8.8 MHz), which results from the synchronous demodulation and addition, for the synchronous demodulation, which corresponds to a full-wave rectification, changes a 2.2 MHz sine wave into a 4.4 MHz half-wave voltage. If two 4.4

MHz half-wave voltages differing in phase by 90° are added together, a low-ripple 8.8 MHz half wave voltage is obtained in addition to the d.c. voltage component. The video signal or composite color signal (FBAS) is further processed in a known manner. For example, the color signal can be separated from the picture signal by means of a comb filter. Then, it is quadrature-demodulated at the chrominance-subcarrier frequency along two axes, namely along R-Y and B-Y in the case of PAL or along I and Q in the case of NTSC. The 5.5. MHz sound signal, too, can be separated from the video signal in a known manner. The burst required to synchronize the chrominance-subcarrier oscillator 13 is filtered out by a filter 23 and applied to the chrominance-subcarrier oscillator 13.

Specific advantages of the invention are as follows.

One low-pass filter slope determines the Nyquist slope for the picture carrier and the chrominance subcarrier and the adjacent-channel selectivity on both sides in the RF spectrum.

Another advantage is the synchronization of the RF oscillator with an automatic control system. The latter not only eliminates the moire which is produced if the chrominance-subcarrier and the picture carrier do not exactly coincide in the IF range, but also prevents hum modulation if it responds quickly, and "microphonics" in the oscillator, i.e., frequency modulation caused by mechanical vibrations (of the loudspeaker, for example) which is seen as striae in the image.

The receiver concept according to the invention is particularly suited for integration because virtually no alignment is needed.

Synchronous demodulators are easy to implement with both analog and digital technology if the frequency is not too high. Since the highest IF is about 2.8 MHz, there are no problems in this respect.

The circuits producing the control voltage for synchronizing the RF oscillator and for adjusting the 90° phase shifter for the RF oscillator voltage as a function of frequency are readily integrable in both digital and analog form.

Even the low-pass filters are integrable despite the required high adjacent-channel selectivity, e.g. in the following manner: if a resistor is integrated so as to have a relatively high capacitance to ground, and the resistor has a suitably elongate shape, an "RC line" is obtained as is known in transmission-line theory for low frequencies, namely a line with a differentially distributed resistance coupled with a differentially distributed capacitance to ground. Such an RC filter system has quite a steep slope at higher attenuation values. However, at low attenuation values, i.e., at a reduction of 1:2, for example, where the Nyquist slope is to be located, its steepness is clearly insufficient, but this can be compensated with a suitable counteracting RC section.

Figure 5:
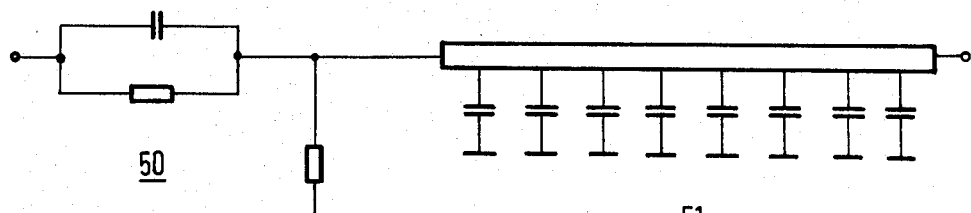
FIG. 5 is a schematic diagram of an integrable low-pass filter for a television receiver in accordance with the invention.

FIG. 5 shows a combination of such a compensating RC section 50, which consists of a capacitor in parallel with a resistor in the series branch and a resistor in the following shunt branch, and the RC "line" 51, which is not much more expensive to integrate that a resistor and a capacitor but has an adjacent-channel selectively of about 40 dB/octave, which can only be achieved with 7 RC sections if active filters are used.

What is claimed is:

1. A superhetrodyne receiver for receiving an amplitude modulated RF (radio frequency) television signal, comprising:

an RF oscillator for producing first and second output signals within the spectrum of said RF signal, said first and second output signals differing in phase by 90 degrees, said RF oscillator being adjustable such that when a vestigial sideband modulated television signal with a picture carrier and a chrominance subcarrier is received the frequency of said first and second output signals is precisely in the middle between the frequency of said picture carrier and said chrominance subcarrier;

a first RF mixer for mixing said RF signal with said first output signal to provide first IF signals;

a second RF mixer for mixing said RF signal with said second output signal to provide second IF signals;

said first and second IF signals each including the picture IF carrier and the chrominance IF subcarrier, said picture IF carrier and said chrominance IF subcarrier coinciding in frequency and having a predetermined fixed phase relationship;

first and second low-pass filters of like design respectively receiving said first and second IF signals and providing first and second IF signal outputs, said first and second low-pass filters each having cut off frequencies located at approximately one half the bandwidth of said RF signal and each having a slope selected to simultaneously serve as Nyquist slopes for said picture IF carrier and said chrominance IF subcarrier, and each having attenuation characters in the cut off regions such that adjacent television signal channels are attenuated in accordance with a predetermined standard;

first and second demodulations for respectively demodulators said first and second IF signal outputs to provide first and second demodulated signals; and an arithmetic circuit for combining said first and second demodulated signals.

2. A receiver in accordance with claim 1, comprising:
   a chrominance subcarrier oscillator;
   a frequency divider coupled to said chrominance subcarrier oscillator for generating a first signal at one half the frequency of said chrominance subcarrier oscillator;
   a phase and frequency comparator for comparing said first signal with said picture IF carrier to generate a control voltage which is phase dependent if said first signal and said picture IF carrier have the same frequency and which is detuning dependent if said first signal and said picture IF carrier differs in frequency; and
   wherein said RF oscillator is responsive to said control voltage such that the frequency of said RF oscillator is dependent on said control voltage.

3. A receiver in accordance with claim 2, wherein said television signal is a PAL standard signal; and
   said phase and frequency comparator operates such that when said first and second IF signals are equal in frequency, said picture IF carrier is in phase with a R-Y signal.

4. A receiver in accordance with claim 2, wherein said television signal is an NTSC standard signal; and
   said phase and frequency comparator operates such that when said first and second IF signals are equal in frequency, the phase of said picture IF carrier differs by 90 degrees from the phase corresponding to a color at which, subjectively, a slight error is perceptible.

5. A receiver in accordance with claim 1 comprising:
a phase comparator for comparing the phases of said picture IF carrier in said first and second IF signals and producing a control voltage dependent on the magnitude and direction of deviation from a phase difference of 90 degrees; and
wherein said RF oscillator comprises a 90 degree phase shifter which is adjustable in response to said control voltage to reduce said deviation.

6. A receiver in accordance with claim 1 comprising:
a phase comparator for comparing the phases of said picture IF carrier in said first and second IF signals and producing a control voltage dependent on the magnitude and direction of deviation from a phase difference of 90 degrees; and
wherein said RF oscillator comprises a 90 degree phase shifter which is adjustable in response to said control voltage to reduce said deviation.

7. A receiver in accordance with claim 2 comprising:
a phase comparator for comparing the phases of said picture IF carrier in said first and second IF signals and producing a control voltage dependent on the magnitude and direction of deviation from a phase difference of 90 degrees; and
wherein said RF oscillator comprises a 90 degree phase shifter which is adjustable in response to said control voltage to reduce said deviation.

8. A receiver in accordance with claim 3 comprising:
a phase comparator for comparing the phases of said picture IF carrier in said first and second IF signals and producing a control voltage dependent on the magnitude and direction of deviation from a phase difference of 90 degrees; and
wherein said RF oscillator comprises a 90 degree phase shifter which is adjustable in response to said control voltage to reduce said deviation.

9. A receiver in accordance with claim 4 comprising:
a phase comparator for comparing the phases of said picture IF carrier in said first and second IF signals and producing a control voltage dependent on the magnitude and direction of deviation from a phase difference of 90 degrees; and
wherein said RF oscillator comprises a 90 degree phase shifter which is adjustable in response to said control voltage to reduce said deviation.

10. A receiver in accordance with claim 1 comprising:
a chrominance subcarrier oscillator;
a frequency dividing means coupled to said chrominance subcarrier oscillator for generating a first signal at one half the frequency of the output of said chrominance subcarrier oscillator and for shifting said first signal in phase by 90 degrees; and
wherein said first demodulator comprises a first synchronous demodulator which mixes said first IF signal with said first signal; and
said second demodulator comprising a second synchronous demodulation which mixes said second IF signal with said first signal, said first and second synchronous demodulation acting as synchronous rectifiers.

11. A receiver in accordance with claim 10, wherein said frequency divider means comprises:
a divide by two frequency divider; and
a phase shifter which shifts the phase of the output signal of said frequency divider by 90 degrees.

12. A receiver in accordance with claim 1 comprising:
a limiter for deriving a picture IF carrier.

* * * * *